United States Patent
Kim et al.

(10) Patent No.: US 10,915,785 B2
(45) Date of Patent: Feb. 9, 2021

(54) SENSOR PIXEL AND FINGERPRINT SENSOR INCLUDING THE SAME

(71) Applicant: SAMSUNG DISPLAY CO., LTD., Yongin-si (KR)

(72) Inventors: Ki Seo Kim, Yongin-si (KR); Jae Kyoung Kim, Yongin-si (KR); Won Sang Park, Yongin-si (KR); Byeong Hee Won, Yongin-si (KR); Byung Han Yoo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 664 days.

(21) Appl. No.: 15/802,960

(22) Filed: Nov. 3, 2017

(65) Prior Publication Data

US 2018/0225547 A1   Aug. 9, 2018

(30) Foreign Application Priority Data

Feb. 7, 2017   (KR) .................. 10-2017-0016863

(51) Int. Cl.
*G06K 9/62*    (2006.01)
*G06K 9/00*    (2006.01)

(52) U.S. Cl.
CPC .......... *G06K 9/6212* (2013.01); *G06K 9/001* (2013.01); *G06K 9/0004* (2013.01); *G06K 9/00026* (2013.01); *G06K 9/6209* (2013.01)

(58) Field of Classification Search
CPC ...... G06K 9/6212; G06K 9/6202; G06K 9/62; G06K 9/00026; G06K 9/00013; G06K 9/0004; G06K 9/001; G06K 9/00087; G06K 9/6209; G06K 9/6206; G06K 9/6203; G06K 9/6201
See application file for complete search history.

(56) References Cited

U.S. PATENT DOCUMENTS

| | | | |
|---|---|---|---|
| 8,669,843 B2 | 3/2014 | Chen | |
| 10,572,043 B2* | 2/2020 | Kim | .......... G06K 9/0002 |
| 2005/0088185 A1* | 4/2005 | Sano | .......... G01D 5/2405 |
| | | | 324/661 |
| 2007/0024546 A1* | 2/2007 | Jang | .......... G06K 9/0002 |
| | | | 345/78 |
| 2013/0287274 A1 | 10/2013 | Shi et al. | |
| 2013/0314148 A1* | 11/2013 | Kang | .......... G06K 9/0002 |
| | | | 327/517 |
| 2016/0103513 A1* | 4/2016 | Yang | .......... G06F 3/042 |
| | | | 345/175 |
| 2017/0371462 A1 | 12/2017 | Kim et al. | |
| 2019/0318691 A1* | 10/2019 | Soni | .......... G09G 3/3233 |

FOREIGN PATENT DOCUMENTS

KR   1020180001677 A   1/2018

* cited by examiner

*Primary Examiner* — John R Lee
(74) *Attorney, Agent, or Firm* — Cantor Colburn LLP

(57) ABSTRACT

A sensor pixel includes a sensor electrode, a first transistor including a gate electrode connected to the sensor electrode and which controls a current output provided to an output line, a second transistor connected to a first voltage line and a first transistor, a third transistor connected to the first transistor and the output line, and a compensator unit which compensates a threshold voltage of the first transistor.

18 Claims, 14 Drawing Sheets

SENSOR PIXEL AND FINGERPRINT SENSOR INCLUDING THE SAME

This application claims priority to Korean Patent Application No. 10-2017-0016863, filed on Feb. 7, 2017, and all the benefits accruing therefrom under 35 U.S.C. § 119, the content of which in its entirety is herein incorporated by reference.

BACKGROUND

1. Field

Exemplary embodiments of the invention relate to a sensor pixel for fingerprint recognition and a fingerprint sensor including the same.

2. Description of the Related Art

Interest in information displays has been on the rise, and demand for portable information media has increased. Accordingly, there has been an increasing demand for display devices, and increased emphasis on the research and commercialization thereof.

A variety of functions utilizing personal information, such as banking services and security, as well as communications functions including phone calls and a text messaging service, have been provided by display devices. Therefore, a fingerprint sensor may be widely used in such display devices in order to prevent other people from accessing the display devices.

Fingerprint sensors may be implemented using various recognition methods. For example, optical fingerprint sensors, thermal fingerprint sensors, and capacitive fingerprint sensors are known in the art.

Among them, a capacitive fingerprint sensor may obtain a shape of a fingerprint (e.g., fingerprint pattern) by detecting changes in capacitance caused by the ridges and valleys of the fingerprint when the human finger approaches a conductive sensing electrode.

SUMMARY

Exemplary embodiments of the invention are directed to a sensor pixel capable of improving fingerprint sensing sensitivity by compensating for a difference in threshold voltage between sensor pixels, and a fingerprint sensor including the same.

A sensor pixel according to an exemplary embodiment of the invention includes a sensor electrode, a first transistor including a gate electrode connected to the sensor electrode and which controls a current output provided to an output line, a second transistor connected to a first voltage line and the first transistor, a third transistor connected to the first transistor and the output line, and a compensator unit which compensates a threshold voltage of the first transistor.

In an exemplary embodiment, the sensor pixel may further include a capacitor electrode which is included in a first capacitor with the sensor electrode.

In an exemplary embodiment, a gate electrode of the second transistor and a gate electrode of the third transistor may be connected to a third scan line.

In an exemplary embodiment, the capacitor electrode may be connected to the third scan line.

In an exemplary embodiment, the compensator unit may include a fourth transistor connected to a second voltage line and a common node between the first and second transistors, and a fifth transistor connected to the sensor electrode and a common node between the first and third transistors.

In an exemplary embodiment, a gate electrode of the fourth transistor and a gate electrode of the fifth transistor may be connected to a second scan line.

In an exemplary embodiment, the sensor pixel may further include a sixth transistor connected to a third voltage line and the sensor electrode.

In an exemplary embodiment, a gate electrode of the sixth transistor may be connected to a first scan line.

A sensor pixel according to an exemplary embodiment includes a first transistor including a gate electrode connected to a first node and which is connected to a second node and a third node in other electrodes, a second transistor including a gate electrode connected to a third scan line and which is connected to a first voltage line and the second node in other electrodes, a third transistor including a gate electrode connected to the third scan line and which is connected to the third node and an output line in other electrodes, a fourth transistor including a gate electrode connected to a second scan line and which is connected to the second node and a second voltage line in other electrodes, a fifth transistor including a gate electrode connected to the second scan line and which is connected to the third node and the first node in other electrodes, a sixth transistor including a gate electrode connected to a first scan line and which is connected to a third voltage line and the first node in other electrodes, and a capacitor connected to the third scan line and the first node.

A fingerprint sensor according to an exemplary embodiment includes sensor pixels, and a scan driver which supplies a scan signal to the sensor pixels, wherein each of the sensor pixels may include a sensor electrode, a first transistor including a gate electrode connected to the sensor electrode and which controls a current output provided to an output line, a second transistor connected to a first voltage line and the first transistor, a third transistor connected to the first transistor and the output line, and a compensator unit which compensates for a threshold voltage of the first transistor.

In an exemplary embodiment, each of the sensor pixels may further include a capacitor electrode which is included in a first capacitor with the sensor electrode.

In an exemplary embodiment, a gate electrode of the second transistor and a gate electrode of the third transistor may be connected to a third scan line.

In an exemplary embodiment, the capacitor electrode may be connected to the third scan line.

In an exemplary embodiment, the compensator unit may include a fourth transistor connected to a second voltage line and a common node between the first and second transistors, and a fifth transistor connected to the sensor electrode and a common node between the first and third transistors.

In an exemplary embodiment, a gate electrode of the fourth transistor and a gate electrode of the fifth transistor may be connected to the second scan line.

In an exemplary embodiment, each of the sensor pixels may further include a sixth transistor connected to a third voltage line and the sensor electrode.

In an exemplary embodiment, a gate electrode of the sixth transistor may be connected to a first scan line.

In an exemplary embodiment, the first voltage line and the second voltage line may be the same voltage line.

In an exemplary embodiment, the first voltage line and the third voltage line may be the same voltage line.

In an exemplary embodiment, the sixth transistor may maintain an ON state during a first period, each of the fourth and fifth transistors may maintain an ON state during a second period, and each of the second and third transistors may maintain an ON state during a third period.

BRIEF DESCRIPTION OF THE DRAWINGS

Exemplary embodiments will now be described more fully hereinafter with reference to the accompanying drawings. However, they may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art.

DETAILED DESCRIPTION

Figure 1:
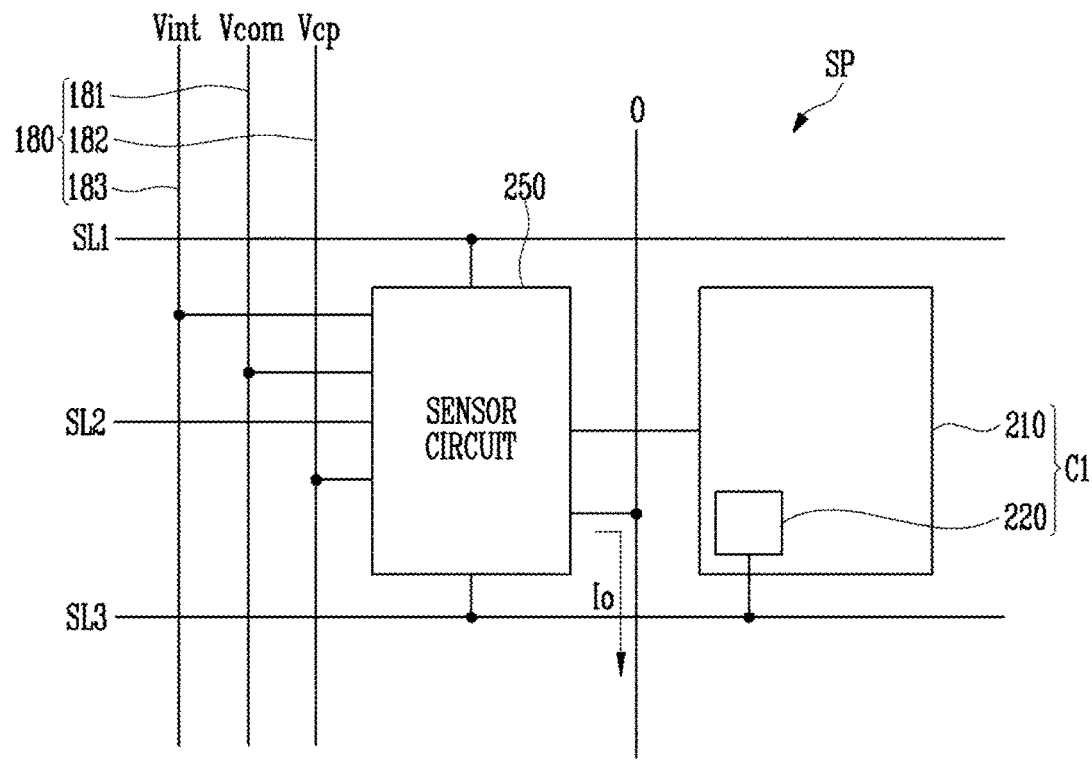
FIG. 1 is a diagram illustrating an exemplary embodiment of a sensor pixel.

Hereinafter, exemplary embodiments of the invention will be described in detail with reference to the accompanying drawings.

The invention now will be described more fully hereinafter with reference to the accompanying drawings, in which various exemplary embodiments are shown. This invention may, however, be embodied in many different forms, and should not be construed as limited to the exemplary embodiments set forth herein. Rather, these exemplary embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a sensor pixel and a fingerprint sensor according to exemplary embodiments of the invention are described below with reference to the drawings associated with the exemplary embodiments of the invention.

FIG. 1 is a diagram illustrating an exemplary embodiment of a sensor pixel SP.

Referring to FIG. 1, the sensor pixel SP may include a sensor electrode 210, a capacitor electrode 220, and a sensor circuit 250.

Figure 2A:
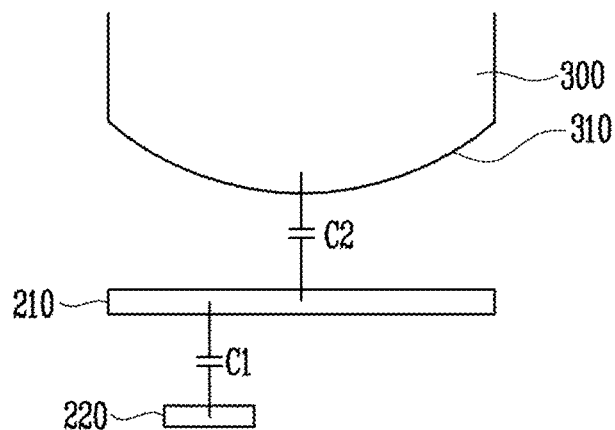
FIGS. 2A and 2B are diagrams illustrating that a capacitance of a second capacitor formed between a sensor electrode and a finger varies depending on whether a point of the finger located over a sensor pixel is a valley or a ridge of the fingerprint.
Figure 2B:
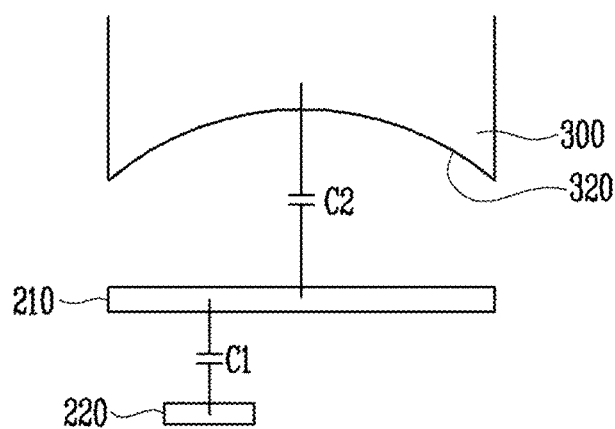

The sensor electrode 210 and the capacitor electrode 220 may be included in a first capacitor C1. In addition, when a user's finger approaches the sensor pixel SP for the purpose of finger recognition, a second capacitor C2 may be formed between the sensor electrode 210 and the user's finger as shown in FIGS. 2A and 2B.

In an exemplary embodiment, the sensor electrode 210 may be connected to the sensor circuit 250 and include a conductive material. Examples of the conductive material may include metals, an alloy thereof, a conductive polymer, and a transparent conductive material.

Examples of the metals may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead.

In an exemplary embodiment, examples of the conductive polymer may include polythiophene compounds, polypyrrole compounds, polyaniline compounds, polyacetylene compounds, polyphenylene compounds, and a mixture thereof. Among the polythiophene compounds, a poly(3,4-ethylenedioxythiophene) polystyrene sulfonate ("PEDOT/PSS") compound may be used, for example.

In an exemplary embodiment, examples of the transparent conductive material may include silver nanowires ("AgNW"), Indium Tin Oxide ("ITO"), Indium Zinc Oxide ("IZO"), Antimony Zinc Oxide ("AZO"), Indium Tin Zinc Oxide ("ITZO"), Zinc Oxide ("ZnO"), and Tin Oxide ("SnO$_2$"), carbon nanotubes, and graphene.

The capacitor electrode 220 may overlap with the sensor electrode 210. The sensor electrode 210 and the capacitor electrode 220 may be included in the first capacitor C1.

In an exemplary embodiment, the capacitor electrode 220 may be coupled to a third scan line SL3. For example, the capacitor electrode 220 may include the same material as the third scan line SL3.

The sensor circuit 250 may be connected to the first capacitor C1, the first scan line SL1, a second scan line SL2, the third scan line SL3, an output line O, and voltage lines 180.

The sensor circuit 250 may operate in response to signals supplied through the first scan line SL1, the second scan line SL2, and the third scan line SL3, and control an output current Io which is output to the output line O.

The voltage lines 180 may include a first voltage line 181, a second voltage line 182, and a third voltage line 183.

In an exemplary embodiment, for example, the first voltage line 181 may supply a first voltage Vcom to the sensor circuit 250, the second voltage line 182 may supply a second voltage Vcp to the sensor circuit 250, and the third voltage line 183 may supply a third voltage Vint to the sensor circuit 250.

A voltage supply unit (not illustrated) may supply the first voltage Vcom, the second voltage Vcp, and the third voltage Vint to the first voltage line 181, the second voltage line 182, and the third voltage line 183, respectively.

FIGS. 2A and 2B are diagrams illustrating that a capacitance of a second capacitor formed between a sensor electrode and a finger changes depending on whether a point of the finger located over a sensor pixel is a ridge or a valley of a fingerprint. More specifically, FIG. 2A illustrates a case that a ridge 310 of a finger 300 is located over the sensor pixel SP, and FIG. 2B illustrates a case that a valley 320 of the finger 300 is located over the sensor pixel SP.

Referring to FIGS. 2A and 2B, the sensor electrode 210 and the capacitor electrode 220 may be included in the first capacitor C1. The sensor electrode 210 and the capacitor electrode 220 may be separated from each other, and an insulating layer (not illustrated) may be interposed therebetween.

In an exemplary embodiment, when the user's finger 300 is located over the sensor pixel SP for the purpose of fingerprint recognition, the second capacitor C2 between the sensor electrode 210 and the finger 300 may occur.

The second capacitor C2 may be a variable capacitor. The capacitance of the second capacitor C2 may vary depending on whether the ridge 310 or the valley 320 is located over the sensor electrode 210.

In other words, the distance between the ridge 310 and the sensor electrode 210 may be shorter than the distance between the valley 320 and the sensor electrode 210. Therefore, the capacitance of the second capacitor C2 when the ridge 310 is located over the sensor electrode 210 as shown in FIG. 2A may be different from the capacitance of the second capacitor C2 when the valley 320 is located over the sensor electrode 210 as shown in FIG. 2B.

The change in capacitance of the second capacitor C2 may affect the output current Io of the sensor pixel SP. Therefore, a read-out circuit (not illustrated) may recognize the user's fingerprint by detecting a variation in the output current Io.

Figure 3:
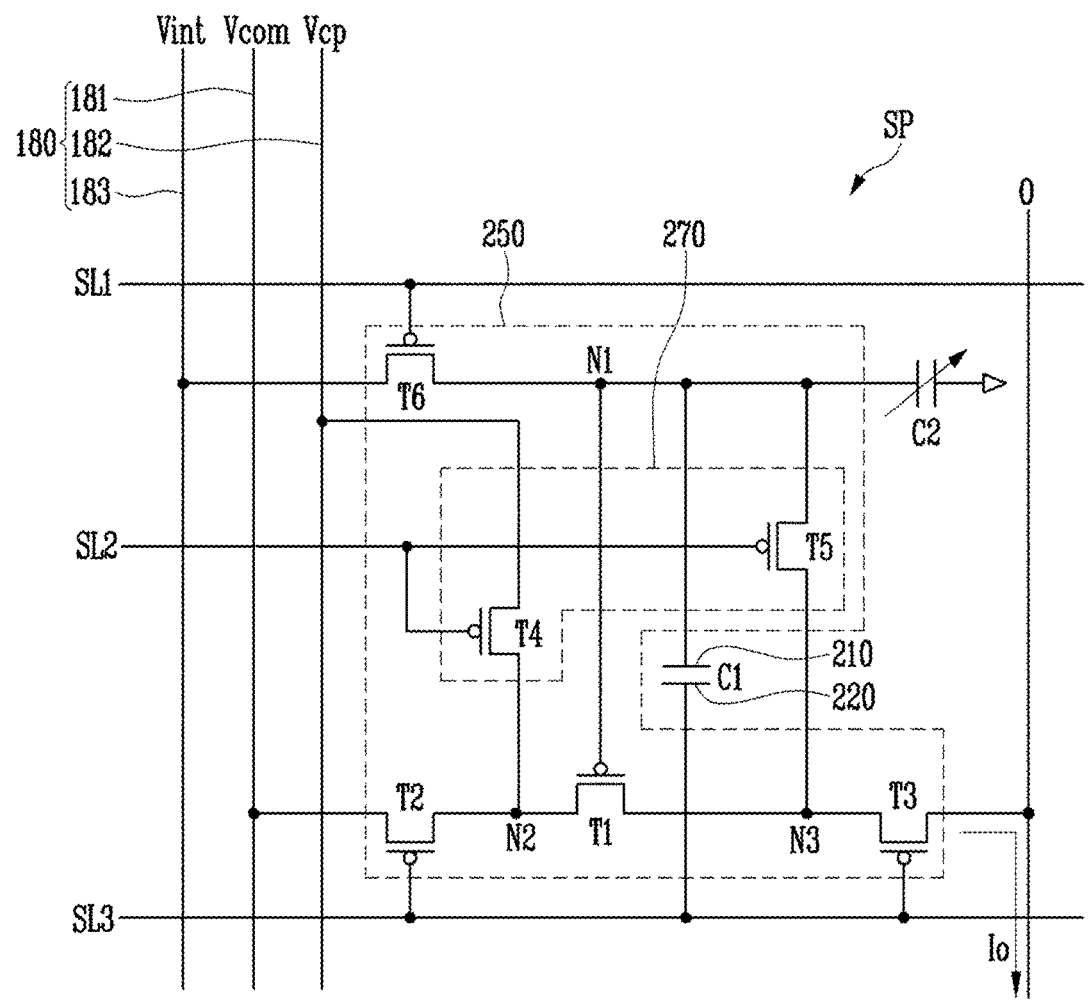
FIG. 3 is a detailed circuit diagram illustrating an exemplary embodiment of the sensor pixel shown in FIG. 1.

FIG. 3 is a detailed circuit diagram of an exemplary embodiment of the sensor pixel SP shown in FIG. 1.

Referring to FIG. 3, according to an exemplary embodiment, the sensor pixel SP may include the first capacitor C1 and the sensor circuit 250.

As described above, the first capacitor C1 may include the sensor electrode 210 and the capacitor electrode 220.

The sensor circuit 250 may include a first transistor T1, a second transistor T2, a third transistor T3, and a compensator unit 270.

The first transistor T1 may include a gate electrode connected to the sensor electrode 210 and control the output current Io, which is output to the output line O.

In an exemplary embodiment, for example, the first transistor T1 may include the gate electrode coupled to a first node N1 and be connected between a second node N2 and a third node N3 in other electrodes.

More specifically, the first transistor T1 may include the gate electrode connected to the first node N1, a first electrode connected to the second node N2, and a second electrode connected to the third node N3.

Therefore, the output current Io may change in response to a gate voltage of the first transistor T1 (e.g., a voltage of the first node N1).

The second transistor T2 may be connected between the first voltage line 181 and the first transistor T1.

In an exemplary embodiment, for example, the second transistor T2 may include a gate electrode connected to the third scan line SL3 and be connected between the first voltage line 181 and the second node N2 in other electrodes.

More specifically, the second transistor T2 may include the gate electrode connected to the third scan line SL3, a first electrode connected to the first voltage line 181, and a second electrode coupled to the second node N2.

Therefore, when a scan signal is supplied to the third scan line SL3, the second transistor T2 may be turned on.

The third transistor T3 may be connected between the first transistor T1 and the output line O.

In an exemplary embodiment, for example, the third transistor T3 may include a gate electrode connected to the third scan line SL3 and be connected between the third node N3 and the output line O in other electrodes.

More specifically, the third transistor T3 may include a gate electrode connected to the third scan line SL3, a first electrode connected to the third node N3, and a second electrode connected to the output line O.

Therefore, when a scan signal is supplied to the third scan line SL3, the third transistor T3 may be turned on.

The compensator unit 270 may compensate for a threshold voltage of the first transistor T1.

In an exemplary embodiment, the compensator unit 270 may include a fourth transistor T4 and a fifth transistor T5.

The fourth transistor T4 may be connected between the second voltage line 182 and the common node N2 between the first and second transistors T1 and T2.

In an exemplary embodiment, for example, the fourth transistor T4 may include a gate electrode connected to the second scan line SL2 and be connected between the second node N2 and the second voltage line 182 in other electrodes.

More specifically, the fourth transistor T4 may include the gate electrode connected to the second scan line SL2, a first electrode connected to the second voltage line 182, and a second electrode connected to the second node N2.

Therefore, when a scan signal is supplied to the second scan line SL2, the fourth transistor T4 may be turned on.

The fifth transistor T5 may be connected between the sensor electrode 210 and the common node N3 between the first transistor T1 and the third transistor T3.

In an exemplary embodiment, for example, the fifth transistor T5 may include a gate electrode coupled to the second scan line SL2 and be connected between the third node N3 and the first node N1 in other electrodes.

More specifically, the fifth transistor T5 may include a gate electrode connected to the second scan line SL2, a first electrode connected to the first node N1, and a second electrode connected to the third node N3.

Therefore, when a scan signal is supplied to the second scan line SL2, the fifth transistor T5 may be turned on.

The first capacitor C1 may be connected between the first node N1 and the third scan line SL3.

In an exemplary embodiment, for example, the sensor electrode 210 may be connected to the first node N1, and the capacitor electrode 220 may be connected to the third scan line SL3.

The second capacitor C2 may be formed when the user's finger 300 approaches the sensor pixel SP. The second capacitor C2 may function as a variable capacitor. The second capacitor C2 may be regarded as being connected in series with the first capacitor C1 at the first node N1 in an equivalent circuit.

In an exemplary embodiment, the sensor circuit 250 may further include a sixth transistor T6 to initialize the sensor pixel SP.

The sixth transistor T6 may be connected between the third voltage line 183 and the sensor electrode 210.

In an exemplary embodiment, for example, the sixth transistor T6 may include a gate electrode coupled to the first scan line SL1 and be connected between the third voltage line 183 and the first node N1 in other electrodes.

More specifically, the sixth transistor T6 may include the gate electrode connected to the first scan line SL1, a first electrode connected to the third voltage line 183, and a second electrode connected to the first node N1.

Therefore, when a scan signal is supplied to the first scan line SL1, the sixth transistor T6 may be turned on.

When the sixth transistor T6 is turned on, a voltage of the sensor electrode 210 which amounts to a voltage of the first node N1 may be changed to the third voltage Vint.

The first electrode of each of the transistors T1, T2, T3, T4, T5, and T6 may be set to one of a source electrode and a drain electrode. The second electrode of each of the transistors T1, T2, T3, T4, T5, and T6 may be set to the other electrode of the source electrode and the drain electrode, which is different from the first electrode. In an exemplary embodiment, for example, when the first electrode is set to a source electrode, the second electrode may be set to a drain electrode.

FIG. 3 illustrates that the transistors T1, T2, T3, T4, T5, and T6 are PMOS transistors. However, according to another embodiment, the transistors T1, T2, T3, T4, T5, and T6 may include NMOS transistors.

Figure 4:
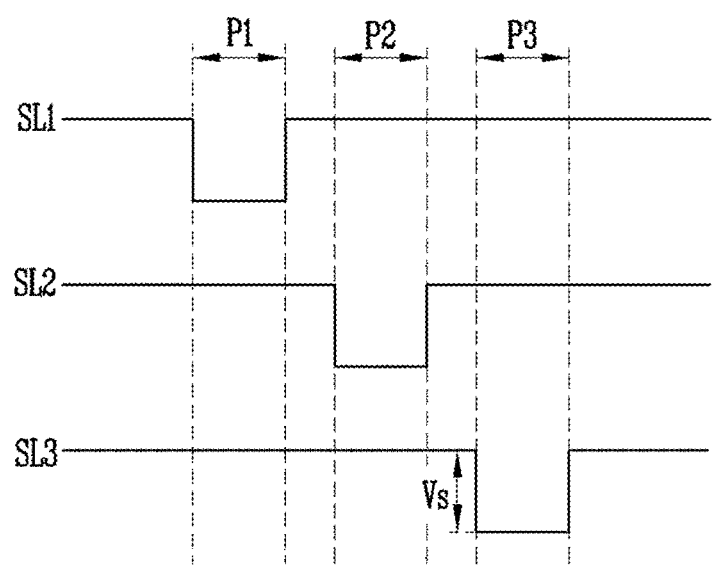
FIG. 4 is a timing diagram of scan signals illustrating exemplary operations of the sensor pixel shown in FIG. 3.

FIG. 4 is a timing diagram of scan signals illustrating exemplary operations of the sensor pixel SP as shown in FIG. 3. FIG. 4 illustrates the timing diagrams of a scan signal supplied to the first scan line SL1, a scan signal supplied to the second scan line SL2, and a scan signal supplied to the third scan line SL3.

Referring to FIG. 4, in association with operations of the sensor pixel SP, a first period P1, which is an initializing period, a second period P2, which is a threshold voltage compensating period, and a third period P3, which is a sensing period, may be in sequential order.

A scan signal may be supplied to the first scan line SL1 during the first period P1.

Therefore, during the first period P1, the sixth transistor T6 may maintain an ON state, and a voltage of the first node N1 may correspond to the third voltage Vint applied from the third voltage line 183.

In an exemplary embodiment, for example, the third voltage Vint may have a voltage level enough to turn on the first transistor T1.

Subsequently, a scan signal may be supplied to the second scan line SL2 during the second period P2.

Therefore, each of the fourth transistor T4 and the fifth transistor T5 included in the compensator unit 270 may maintain an ON state during the second period P2.

When the fourth transistor T4 is turned on, the second voltage Vcp may be applied to the second node N2. When the fifth transistor T5 is turned on, the first transistor T1 may function as a diode.

Therefore, a voltage VN1 of the first node N1 during the second period P2 may be set to a value obtained by subtracting a threshold voltage Vth1 of the first transistor T1 from the second voltage Vcp according to the following Equation:

$$VN1 = Vcp - Vth1.$$

Subsequently, a scan signal may be supplied to the third scan line SL3 during the third period P3.

Therefore, during the third period P3, each of the second transistor T2 and the third transistor T3 may maintain an ON state. Therefore, the output current Io may flow from the first voltage line 181 to the output line O.

The first transistor T1 may control the amount of the output current Io in response to the gate voltage which is the voltage VN1 of the first node N1.

In an exemplary embodiment, for example, the output current Io may change in response to the voltage VN1 of the first node N1, and the voltage VN1 of the first node N1 during the third period P3 may be determined by the following Equation:

$$VN1 = Vcp - Vth1 + (Cc1/(Cc1+Cc2))*Vs.$$

In this Equation, Cc1 is a capacitance of the first capacitor C1, Cc2 is a capacitance of the second capacitor C2, and Vs is a voltage variation of the scan signal supplied to the third scan line SL3.

In an exemplary embodiment, the output current Io may be determined by the following Equation:

$$Io = K*(Vsg - Vth1)^2.$$

In this Equation, K is a constant, and Vsg is a voltage difference between the first electrode and the gate electrode of the first transistor T1.

Since the first electrode of the first transistor T1 has the first voltage Vcom during the third period P3, the output current Io during the third period P3 may be expressed by the following Equation:

$$Io = K*\{Vcom - (Vcp - Vth1 + (Cc1/(Cc1+Cc2))*Vs) - Vth1\}^2 =$$
$$K*\{Vcom - Vcp - (Cc1/(Cc1+Cc2))*Vs\}^2.$$

As a result, the output current Io which is output from the first transistor T1 may be determined regardless of the threshold voltage Vth1, such that non-uniformity in sensitivity caused by the difference in threshold voltage between the sensor pixels may be eliminated.

A read-out circuit (not illustrated) may recognize the ridge 310 and the valley 320 of the fingerprint by using the output current Io.

In other words, a capacitance Cc2 of the second capacitor C2 may vary depending on whether the ridge 310 or the valley 320 is located over the sensor electrode 210. A variation of the capacitance Cc2 of the second capacitor C2 may affect the output current Io of the sensor pixel SP. Thus, the read-out circuit (not shown) may recognize the ridge 310 and the valley 320 of the fingerprint by sensing the variation of the output current Io.

Figure 5:
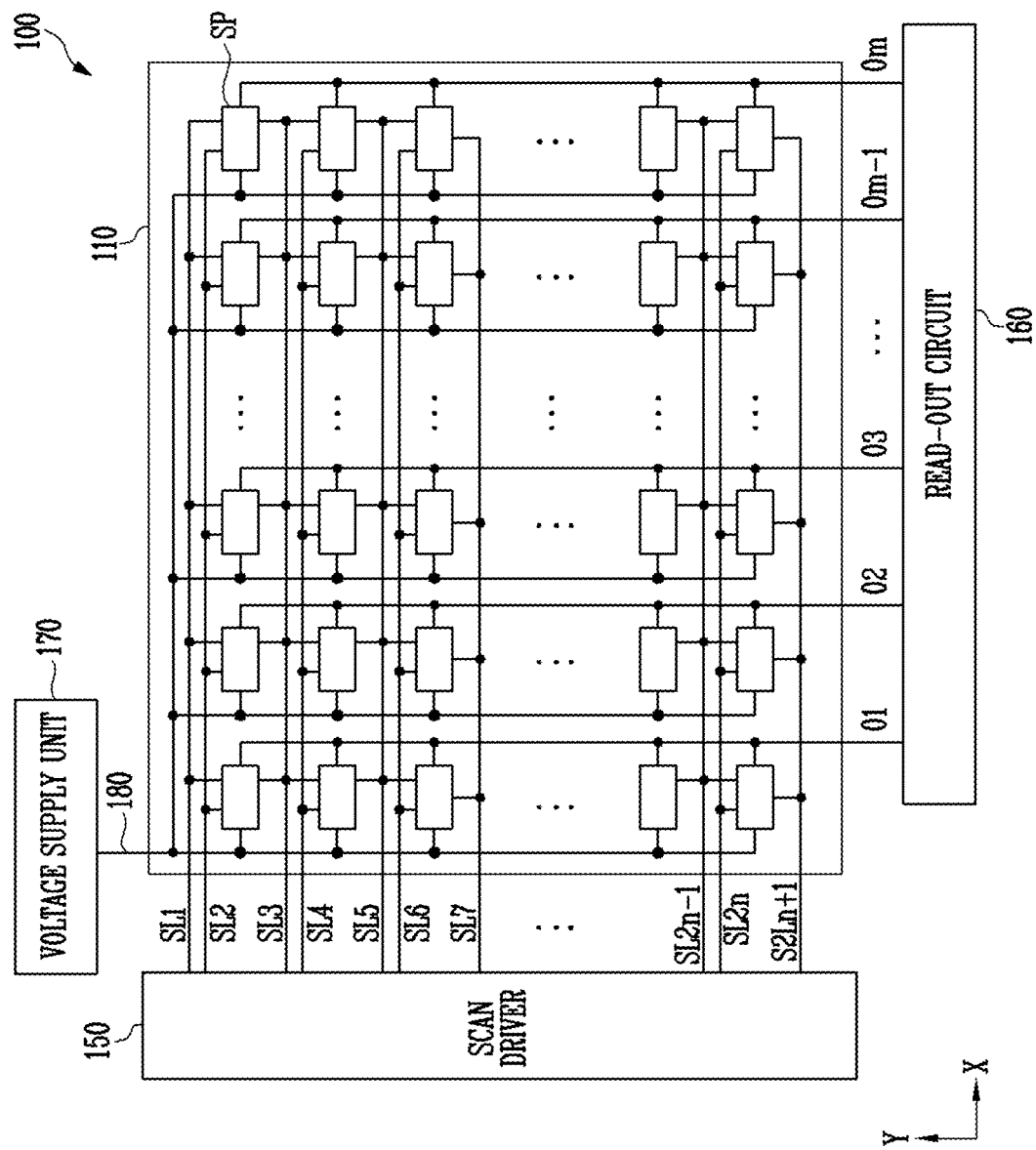
FIG. 5 is a diagram illustrating an exemplary embodiment of a fingerprint sensor.

FIG. 5 is a diagram illustrating exemplary embodiment of a fingerprint sensor 100.

Referring to FIG. 5, the fingerprint sensor 100 may include sensor pixels SP, a scan driver 150, and a read-out circuit 160.

The sensor pixels SP may be disposed on a substrate 110. In an exemplary embodiment, the sensor pixels SP may be arranged in an n×m matrix form, where n and m are natural numbers. In addition, the sensor pixels SP may be connected to scan lines SL1 to SL2n+1 and output lines O1 to Om.

Each of the sensor pixels SP may receive a scan signal through one of the scan lines SL1 to SL2n+1 and output a predetermined current corresponding to a valley or ridge of a fingerprint to one of the output lines O1 to Om.

The scan lines SL1 to SL2n+1 may be disposed on the substrate 110 and extend in a first direction (e.g., X-axis direction), and each of the scan lines SL1 to SL2n+1 may be connected to corresponding sensor pixels SP arranged in the first direction.

The output lines O1 to Om may be disposed on the substrate 110 and extend in a second direction (e.g., Y-axis direction), and each of the output lines O1 to Om may be connected to corresponding sensor pixels SP arranged in the second direction.

However, the directions in which the scan lines SL1 to SLn and the output lines O1 to Om are arranged are not limited thereto and may be changed.

In an exemplary embodiment, the sensor pixels SP may be connected to the voltage line 180 and receive a driving voltage from the voltage supply unit 170.

The scan driver 150 may supply scan signals to the sensor pixels SP through the scan lines SL1 to SL2n+1.

In an exemplary embodiment, for example, the scan driver 150 may sequentially output the scan signals to the scan lines SL1 to SL2n+1.

A scan signal may have a voltage level enough for a transistor receiving the scan signal to be turned on.

The scan driver 150 may be directly mounted on the substrate 110, or may be connected to the substrate 110 through a separate component such as a flexible printed circuit board to be connected to the scan lines SL1 to SL2n+1.

The read-out circuit 160 may receive signals (e.g., current) from the sensor pixels SP through the output lines O1 to Om.

In an exemplary embodiment, for example, when the scan driver 150 sequentially supplies scan signals to the scan lines in an order from the scan line SL1 to the scan line SL2n+1, the sensor pixels SP corresponding to respective scan lines may be selected sequentially, and the read-out circuit 160 may sequentially receive the current outputs in an order from the sensor pixels SP corresponding to the scan line SL1 to the sensor pixels SP corresponding to the scan line SL2n+1.

The read-out circuit 160 may recognize fingerprint information by sensing variations in current.

The read-out circuit 160 may be directly mounted on the substrate 110, or may be connected to the substrate 110 through a separate component such as a flexible printed circuit board, to be connected to the output lines O1 to Om.

The voltage supply unit 170 may supply a predetermined voltage to the sensor pixels SP through the voltage line 180.

The voltage supply unit 170 may be directly mounted on the substrate 110, or may be connected to the substrate 110 through a separate component such as a flexible printed circuit board, to be connected to the voltage line 180.

In FIG. 5, the scan driver 150, the read-out circuit 160, and the voltage supply unit 170 are illustrated as separate components. However, at least some of the components may be integrated in alternative exemplary embodiment.

In addition, the scan driver 150, the read-out circuit 160, and the voltage supply unit 170 may be provided using various methods such as a chip on glass method, a chip on plastic method, a tape carrier package method, and a chip on film method.

Figure 6:
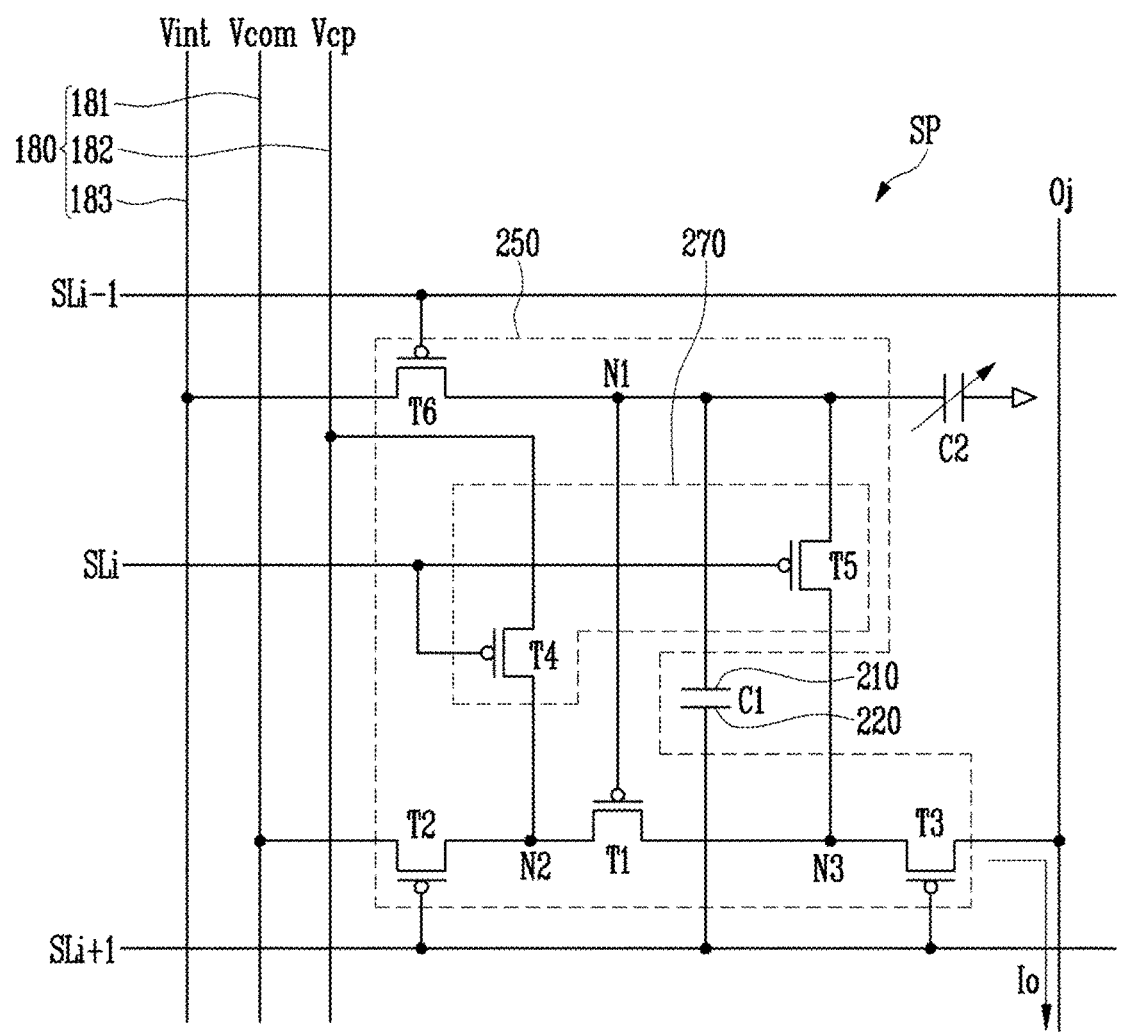
FIG. 6 is a detailed circuit diagram illustrating an exemplary embodiment of a sensor pixel shown in FIG. 5.
Figure 7:
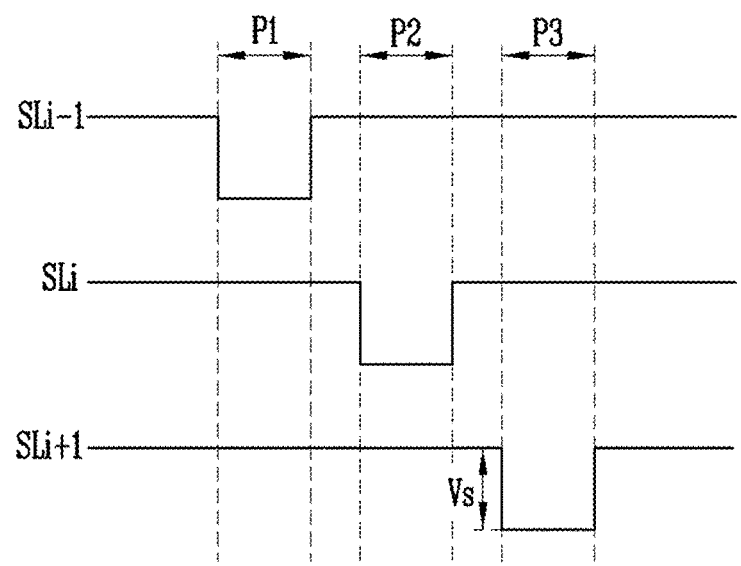
FIG. 7 is a timing diagram of scan signals illustrating exemplary operations of the sensor pixel shown in FIG. 6.

FIG. 6 is a detailed circuit diagram illustrating an exemplary embodiment of a sensor pixel SP shown in FIG. 5. FIG. 7 is a timing diagram of scan signals illustrating exemplary operations of the sensor pixel SP shown in FIG. 6.

For convenience of explanation, FIG. 6 illustrates the sensor pixel SP connected to an i−1-th scan line SLi−1, an i-th scan line SLi, an i+1-th scan line SLi+1, and a j-th output line Oj, where i is an integer of 2 or more and j is a natural number. In addition, FIG. 7 illustrates a scan signal supplied to the i−1-th scan line SLi−1, a scan signal supplied to the i-th scan line SLi, and a scan signal supplied to an i+1-th scan line SLi+1.

Referring to FIG. 6, the sensor pixel SP may include the first capacitor C1 and the sensor circuit 250.

The sensor circuit 250 may include the first transistor T1, the second transistor T2, the third transistor T3, and the compensator unit 270.

The first transistor T1 may include a gate electrode connected to the sensor electrode 210 and control the output current Io which is output to the j-th output line Oj.

In an exemplary embodiment, for example, the first transistor T1 may include the gate electrode connected to the first node N1 and be connected between the second node N2 and the third node N3 in other electrodes.

More specifically, the first transistor T1 may include the gate electrode connected to the first node N1, a first electrode connected to the second node N2, and a second electrode connected to the third node N3.

Therefore, the output current Io may vary in response to a gate voltage of the first transistor T1 (e.g., a voltage of the first node N1).

The second transistor T2 may be connected between the first voltage line 181 and the first transistor T1.

In an exemplary embodiment, for example, the second transistor T2 may include a gate electrode connected to the i+1-th scan line SLi+1 and be connected between the first voltage line 181 and the second node N2 in other electrodes.

More specifically, the second transistor T2 may include the gate electrode connected to the i+1-th scan line SLi+1, a first electrode connected to the first voltage line 181, and a second electrode connected to the second node N2.

Therefore, when a scan signal is supplied to the i+1-th scan line SLi+1, the second transistor T2 may be turned on.

The third transistor T3 may be connected between the first transistor T1 and the j-th output line Oj.

In an exemplary embodiment, for example, the third transistor T3 may include the gate electrode coupled to the i+1-th scan line SLi+1 and be connected between the third node N3 and the j-th output line Oj in other electrodes.

More specifically, the third transistor T3 may include the gate electrode coupled to the i+1-th scan line SLi+1, a first electrode coupled to the third node N3, and a second electrode coupled to the j-th output line Oj.

Therefore, when a scan signal is supplied to the i+1-th scan line SLi+1, the third transistor T3 may be turned on.

The compensator unit 270 may compensate for a threshold voltage of the first transistor T1.

The compensator unit 270 may include the fourth transistor T4 and the fifth transistor T5.

The fourth transistor T4 may be connected between the second voltage line 182 and the common node N2 of the first and second transistors T1 and T2.

In an exemplary embodiment, for example, the fourth transistor T4 may include a gate electrode coupled to the i-th scan line SLi and be connected between the second node N2 and the second voltage line 182 in other electrodes.

More specifically, the fourth transistor T4 may include the gate electrode coupled to the i-th scan line SLi, a first electrode connected to the second voltage line 182, and a second electrode connected to the second node N2.

Therefore, when a scan signal is supplied to the i-th scan line SLi, the fourth transistor T4 may be turned on.

The fifth transistor T5 may be connected between the sensor electrode 210 and the common node N3 of the first and third transistors T1 and T3.

In an exemplary embodiment, for example, the fifth transistor T5 may include a gate electrode connected to the i-th scan line SLi and be connected between the third node N3 and the first node N1 in other electrodes.

More specifically, the fifth transistor T5 may include the gate electrode connected to the i-th scan line SLi, a first electrode connected to the first node N1, and a second electrode connected to the third node N3.

Therefore, when a scan signal is supplied to the i-th scan line SLi, the fifth transistor T5 may be turned on.

The first capacitor C1 may be connected between the first node N1 and the i+1-th scan line SLi+1.

In an exemplary embodiment, for example, the sensor electrode 210 may be connected to the first node N1 and the capacitor electrode 220 may be connected to the i+1-th scan line SLi+1.

The second capacitor C2 may be formed when the user's finger 300 approaches the sensor pixel SP and function as a variable capacitor. The second capacitor C2 may be regarded as being connected in series with the first capacitor C1 at the first node N1 in an equivalent circuit.

In an exemplary embodiment, the sensor circuit 250 may additionally include the sixth transistor T6 to initialize the sensor pixel SP.

The sixth transistor T6 may be connected between the third voltage line 183 and the sensor electrode 210.

In an exemplary embodiment, for example, the sixth transistor T6 may include a gate electrode connected to the i−1-th scan line SLi−1 and be connected between the third voltage line 183 and the first node N1 in other electrodes.

More specifically, the sixth transistor T6 may include the gate electrode connected to the i−1-th scan line SLi−1, a first electrode connected to the third voltage line 183, and a second electrode connected to the first node N1.

Therefore, when a scan signal is supplied to the i−1-th scan line SLi−1, the sixth transistor T6 may be turned on.

When the sixth transistor T6 is turned on, a voltage of the sensor electrode 210 which amounts to a voltage of the first node N1 may be changed to the third voltage Vint.

The first electrode of each of the transistors T1, T2, T3, T4, T5, and T6 may be set to one of a source electrode and a drain electrode, and the second electrode of each of the transistors T1, T2, T3, T4, T5, and T6 may be set to the other electrode of the source electrode and the drain electrode, which is different from the first electrode. In an exemplary embodiment, for example, when the first electrode is set to the source electrode, the second electrode may be set to the drain electrode.

Referring to FIG. 6, the transistors T1, T2, T3, T4, T5, and T6 are illustrated as PMOS transistors. However, according to another embodiment, the transistors T1, T2, T3, T4, T5, and T6 may be composed of NMOS transistors.

Referring to FIG. 7, a scan signal may be supplied to the i−1-th scan line SLi−1 during the first period P1, a scan signal may be supplied to the i-th scan line SLi during the second period P2, and a scan signal may be supplied to the i+1-th scan line SLi+1 during the third period P3.

In other words, the i−1-th scan line SLi−1, the i-th scan line SLi, and the i+1-th scan line SLi+1 may correspond to the first scan line SL1, the second scan line SL2, and the third scan line SL3 described above with reference to FIG. 4, respectively.

Therefore, the sensor pixel SP shown in FIG. 6 may operate in the same manner as the sensor pixel SP shown in FIG. 3. A description of the operations of the sensor pixel SP described above with reference to FIG. 6 is omitted.

Figure 8:
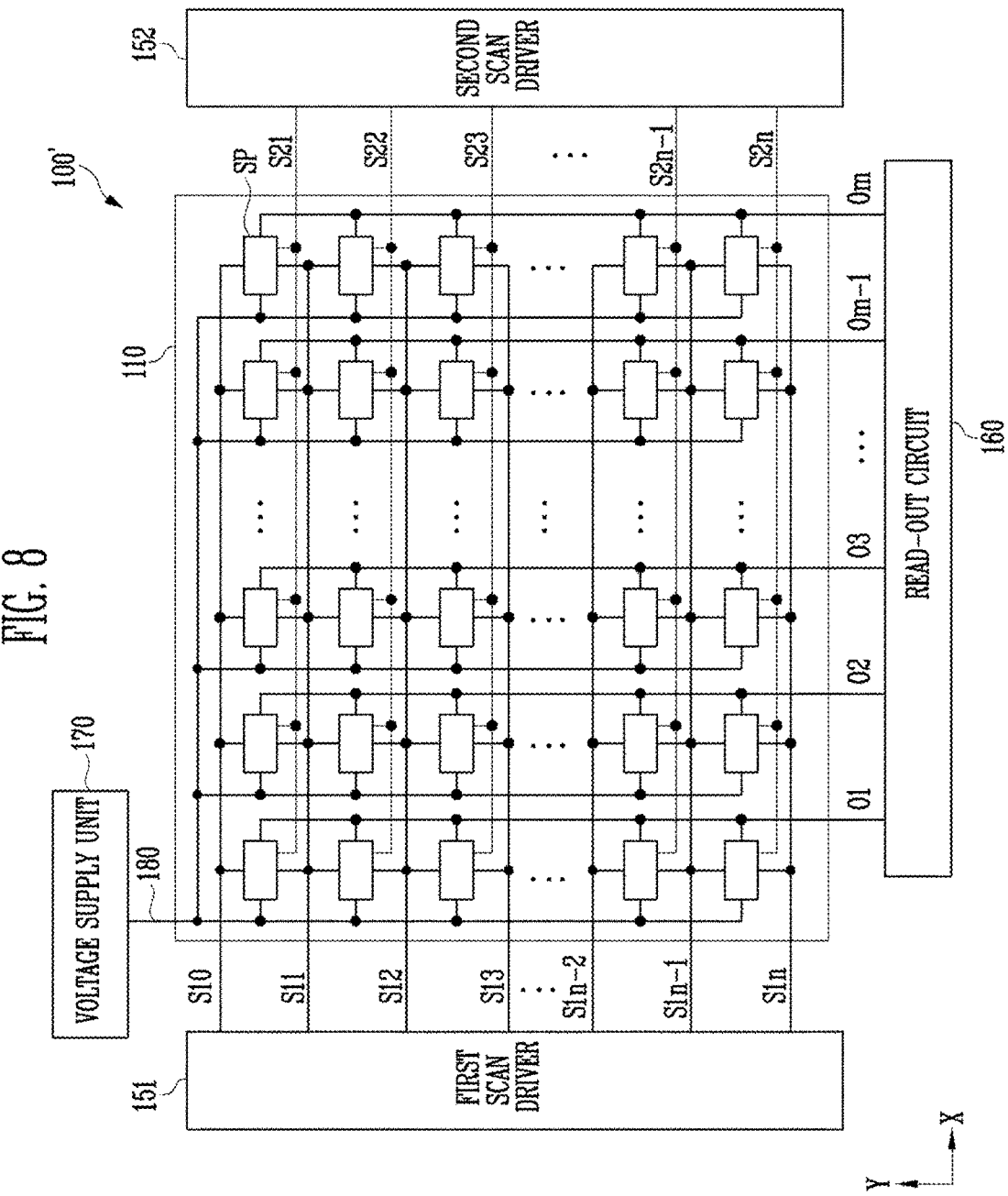
FIG. 8 is a diagram illustrating another exemplary embodiment of a fingerprint sensor.

FIG. 8 is a diagram illustrating an exemplary embodiment of a fingerprint sensor 100'.

Referring to FIG. 8, the fingerprint sensor 100' may include the sensor pixels SP, the first scan driver 151, the second scan driver 152, and the read-out circuit 160.

The sensor pixels SP may be disposed on the substrate 110. In an exemplary embodiment, the sensor pixels SP may be arranged in an n×m matrix form, where n and m are natural numbers. In addition, the sensor pixels SP may be connected to first scan lines S10 to S1n, second scan lines S21 to S2n and the output lines O1 to Om.

The sensor pixels SP may receive scan signals through the first scan lines S10 to S1n and the second scan lines S21 to S2n. In addition, the sensor pixels SP may output a predetermined current corresponding to valleys and ridges of a fingerprint to the output lines O1 to Om.

The first scan lines S10 to S1n may be disposed on the substrate 110 and extend in a first direction (e.g., X-axis direction), and each of the scan lines S11 to S1n may be connected to corresponding sensor pixels SP arranged in the first direction.

In addition, the second scan lines S21 to S2n may be disposed on the substrate 110 and extend in the first direction (e.g., X-axis direction), and each of the scan lines S21 to S2n may be connected to corresponding sensor pixels SP arranged in the first direction.

The output lines O1 to Om may be disposed on the substrate 110 and extend in a second direction (e.g., Y-axis direction), and each of the output lines O1 to Om may to be connected to corresponding sensor pixels SP arranged in the second direction.

However, the directions in which the first scan lines S10 to S1n, the second scan lines S21 to S2n, and the output lines O1 to Om are arranged are not limited thereto, and may be changed.

In an exemplary embodiment, the sensor pixels SP may be connected to the voltage line 180 and receive a driving voltage from the voltage supply unit 170.

The first scan driver 151 may supply scan signals to the sensor pixels SP through the first scan lines S10 to S1n.

In an exemplary embodiment, for example, the first scan driver 151 may sequentially output scan signals to the first scan lines S10 to S1n.

The scan signal may have a voltage level enough for a transistor receiving the scan signal to be turned on.

The first scan driver 151 may be directly mounted on the substrate 110, or may be connected to the substrate 110 through a separate component such as a flexible printed circuit board, to be connected to the first scan lines S10 to S1n.

The second scan driver 152 may supply scan signals to the sensor pixels SP through the second scan lines S21 to S2n.

In an exemplary embodiment, for example, the second scan driver 152 may sequentially output scan signals to the second scan lines S21 to S2n.

The second scan driver 152 may be directly mounted on the substrate 110, or may be connected to the substrate 110 through a separate component such as a flexible printed circuit board, to be connected to the second scan driver 152.

The read-out circuit 160 may receive signals (e.g., current) which is output from the sensor pixels SP through the output lines O1 to Om.

In an exemplary embodiment, for example, when the sensor pixels SP sequentially receive scan signals, the sensor pixels SP may be selected in units of lines, and the read-out circuit 160 may sequentially receive currents output from the sensor pixels SP in units of lines.

The read-out circuit 160 may recognize fingerprint information by sensing current variations.

The read-out circuit 160 may be directly mounted on the substrate 110, or may be connected to the substrate 110 through a separate component such as a flexible printed circuit board, to be output lines O1 to Om.

The voltage supply unit 170 may supply a predetermined voltage to the sensor pixels SP through the voltage line 180.

The voltage supply unit 170 may be directly mounted on the substrate 110, or may be connected to the substrate 110 through a separate component such as a flexible printed circuit board, to be connected to the voltage line 180.

As illustrated in FIG. 8, the first scan driver 151, the second scan driver 152, the read-out circuit 160, and the voltage supply unit 170 may be separate components. However, at least some of the components may be integrated in alternative exemplary embodiment.

In addition, the first scan driver 151, the second scan driver 152, the read-out circuit 160, and the voltage supply unit 170 may be provided using various methods such as a chip on glass method, a chip on plastic method, a tape carrier package method, and a chip on film method.

Figure 9:
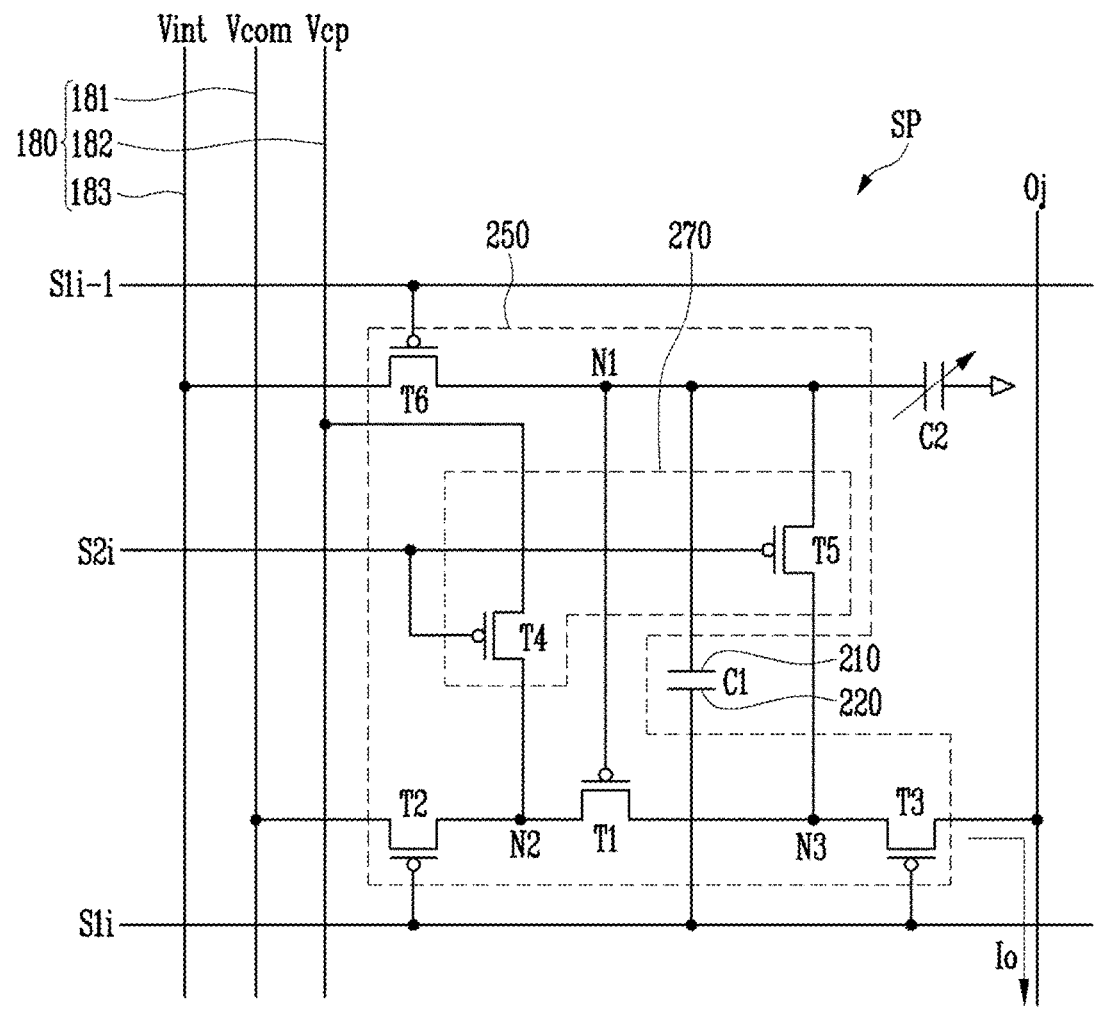
FIG. 9 is a detailed circuit diagram illustrating an exemplary embodiment of a sensor pixel shown in FIG. 8.
Figure 10:
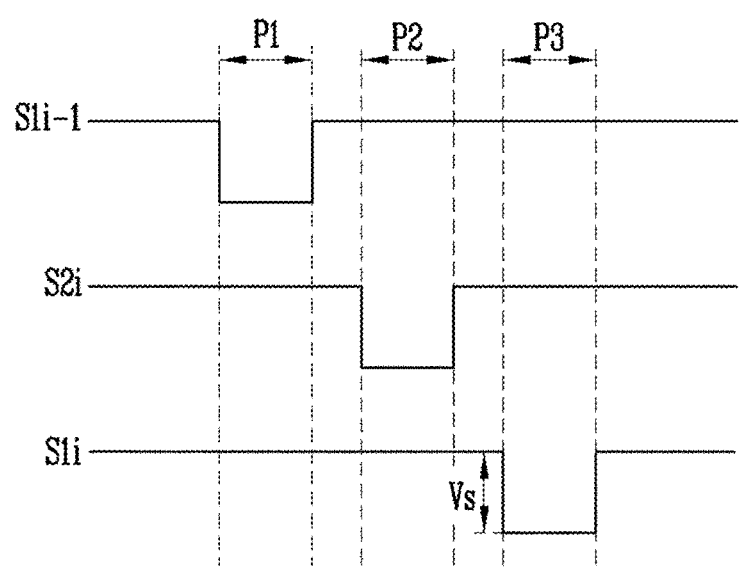
FIG. 10 is a timing diagram of scan signals illustrating exemplary operations of the sensor pixel shown in FIG. 9.

FIG. 9 is a detailed diagram of a sensor pixel SP shown in FIG. 8. FIG. 10 is a timing diagram of scan signals illustrating exemplary operations of the sensor pixel SP shown in FIG. 9.

For convenience of explanation, FIG. 9 illustrates the sensor pixel SP connected to an i−1-th first scan line S1i−1, an i-th first scan line S1i, an i-th second scan line S2i, and the j-th output line Oj, where i is an integer of 2 or more and j is a natural number. In addition, FIG. 10 illustrates scan signals supplied to the i−1-th first scan line S1i−1, a scan signal supplied to the i-th second scan line S2i, and a scan signal supplied to the i-th first scan line S1i.

Referring to FIG. 9, the sensor pixel SP may include the first capacitor C1 and the sensor circuit 250.

The sensor circuit 250 may include the first transistor T1, the second transistor T2, the third transistor T3, and the compensator unit 270.

The first transistor T1 may include a gate electrode connected to the sensor electrode 210 and control the output current Io which is output to the j-th output line Oj.

In an exemplary embodiment, for example, the first transistor T1 may include the gate electrode connected to the first node N1 and be connected between the second node N2 and the third node N3 in other electrodes.

More specifically, the first transistor T1 may include the gate electrode connected to the first node N1, a first electrode connected to the second node N2, and a second electrode connected to the third node N3.

The output current Io may change in response to a gate voltage of the first transistor T1 (e.g., a voltage of the first node N1).

The second transistor T2 may be connected between the first voltage line 181 and the first transistor T1.

In an exemplary embodiment, for example, the second transistor T2 may be connected to a gate electrode connected to the i-th first scan line S1i and connected between the first voltage line 181 and the second node N2 in other electrodes.

More specifically, the second transistor T2 may include the gate electrode connected to the i-th first scan line S1i, a first electrode connected to the first voltage line 181, and a second electrode connected to the second node N2.

When a scan signal is supplied to the i-th first scan line S1i, the second transistor T2 may be turned on.

The third transistor T3 may be connected between the first transistor T1 and the j-th output line Oj.

In an exemplary embodiment, for example, the third transistor T3 may include a gate electrode connected to the i-th first scan line S1i and be connected between the third node N3 and the j-th output line Oj in other electrodes.

More specifically, the third transistor T3 may include the gate electrode connected to the i-th first scan line S1i, a first electrode connected to the third node N3, and a second electrode connected to the j-th output line Oj.

Therefore, when a scan signal is supplied to the i-th first scan line S1i, the third transistor T3 may be turned on.

The compensator unit 270 may compensate for a threshold voltage of the first transistor T1.

The compensator unit 270 may include the fourth transistor T4 and the fifth transistor T5.

The fourth transistor T4 may be connected between the second voltage line 182 and the common node N2 of the first and second transistors T1 and T2.

In an exemplary embodiment, for example, the fourth transistor T4 may include a gate electrode connected to the i-th second scan line S2i and be connected between the second node N2 and the second voltage line 182 in other electrodes.

More specifically, the fourth transistor T4 may include the gate electrode connected to the i-th second scan line S2i, a first electrode connected to the second voltage line 182, and a second electrode connected to the second node N2.

Therefore, when a scan signal is supplied to the i-th second scan line S2i, the fourth transistor T4 may be turned on.

The fifth transistor T5 may be connected between the sensor electrode 210 and the common node N3 of the first and third transistors T1 and T3.

In an exemplary embodiment, for example, the fifth transistor T5 may include a gate electrode connected to the i-th second scan line S2i and be connected between the third node N3 and the first node N1 in other electrodes.

More specifically, the fifth transistor T5 may include the gate electrode connected to the i-th second scan line S2i, a first electrode connected to the first node N1, and a second electrode connected to the third node N3.

Therefore, when a scan signal is supplied to the i-th second scan line S2i, the fifth transistor T5 may be turned on.

The first capacitor C1 may be connected between the first node N1 and the i-th first scan line S1i.

In an exemplary embodiment, for example, the sensor electrode 210 may be connected to the first node N1 and the capacitor electrode 220 may be connected to the i-th first scan line S1i.

The second capacitor C2 may be formed when the user's finger 300 approaches the sensor pixel SP and function as a variable capacitor. The second capacitor C2 may be considered as being connected in series with the first capacitor C1 at the first node N1 in an equivalent circuit.

In addition, the sensor circuit 250 may additionally include the sixth transistor T6 to initialize the sensor pixel SP.

The sixth transistor T6 may be connected between the third voltage line 183 and the sensor electrode 210.

In an exemplary embodiment, for example, the sixth transistor T6 may include a gate electrode connected to the i−1-th first scan line S1i−1 and be connected between the third voltage line 183 and the first node N1 in other electrodes.

More specifically, the sixth transistor T6 may include the gate electrode connected to the i−1-th first scan line S1i−1, a first electrode connected to the third voltage line 183, and a second electrode connected to the first node N1.

Therefore, when a scan signal is supplied to the i−1-th first scan line S1i−1, the sixth transistor T6 may be turned on.

When the sixth transistor T6 is turned on, a voltage of the sensor electrode 210 which amounts to a voltage of the first node N1 may be changed to the third voltage Vint.

The first electrode of each of the transistors T1, T2, T3, T4, T5, and T6 may be set to one of a source electrode and a drain electrode, and the second electrode of each of the transistors T1, T2, T3, T4, T5, and T6 may be set to the other electrode of the source electrode and the drain electrode, which is different from the first electrode. In an exemplary embodiment, for example, when the first electrode is set to the source electrode, the second electrode may be set to the drain electrode.

As illustrated in FIG. 9, the transistors T1, T2, T3, T4, T5, and T6 may be PMOS transistors. However, according to another embodiment, the transistors T1, T2, T3, T4, T5, and T6 may be NMOS transistors.

Referring to FIG. 10, a scan signal may be supplied to the i−1-th first scan line S1i−1 during the first period P1, a scan signal may be supplied to the i-th second scan line S2i during the second period P2, and a scan signal is supplied to the i-th first scan line S1i during the third period P3.

In other words, the i−1-th first scan line S1i−1, the i-th second scan line S2i, and the i-th first scan line S1i may correspond to the first scan line SL1, the second scan line SL2, and the third scan line SL3 described with reference to FIG. 4, respectively.

Therefore, the sensor pixel SP shown in FIG. 9 may also operate in the same manner as the sensor pixel SP shown in FIG. 3. Thus, operations of the sensor pixel SP shown in FIG. 9 will be omitted.

FIGS. 11A to 11D are detailed circuit diagrams illustrating various embodiments of voltage lines. A description will be made on the basis of the sensor pixel SP shown in FIG. 9. The same may apply to the other embodiments the sensor pixels SP described above.

Figure 11A:
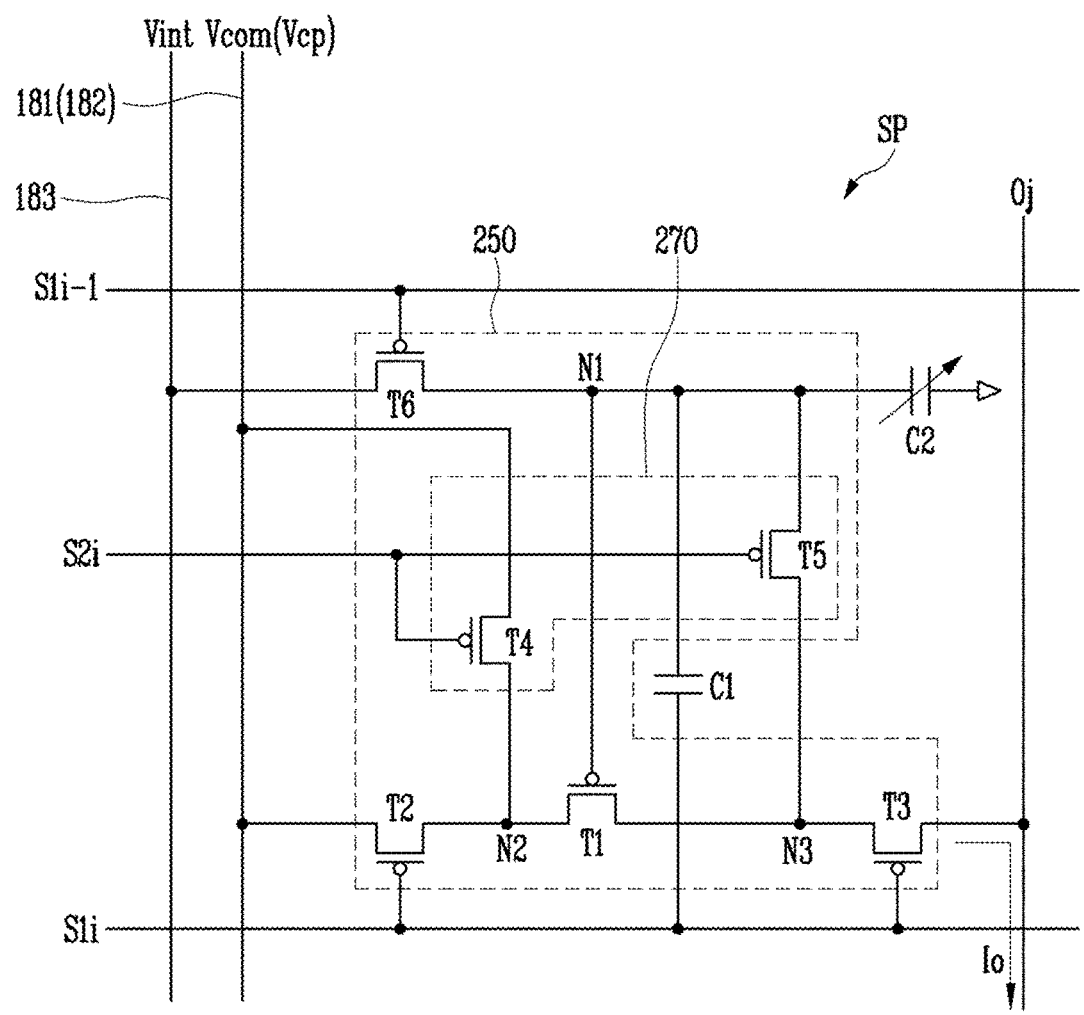
FIGS. 11A to 11D are detailed circuit diagrams illustrating various exemplary embodiments of voltage lines of the sensor pixel of FIG. 9.

Referring to FIG. 11A, in the case that the second voltage Vcp has the same value as the first voltage Vcom, one voltage line may be used as both the second voltage line 182 and the first voltage line 181.

Therefore, the first voltage line 181 and the second voltage line 182 may refer to the same voltage line. In comparison with the above exemplary embodiments, the number of voltage lines may be reduced.

Figure 11B:
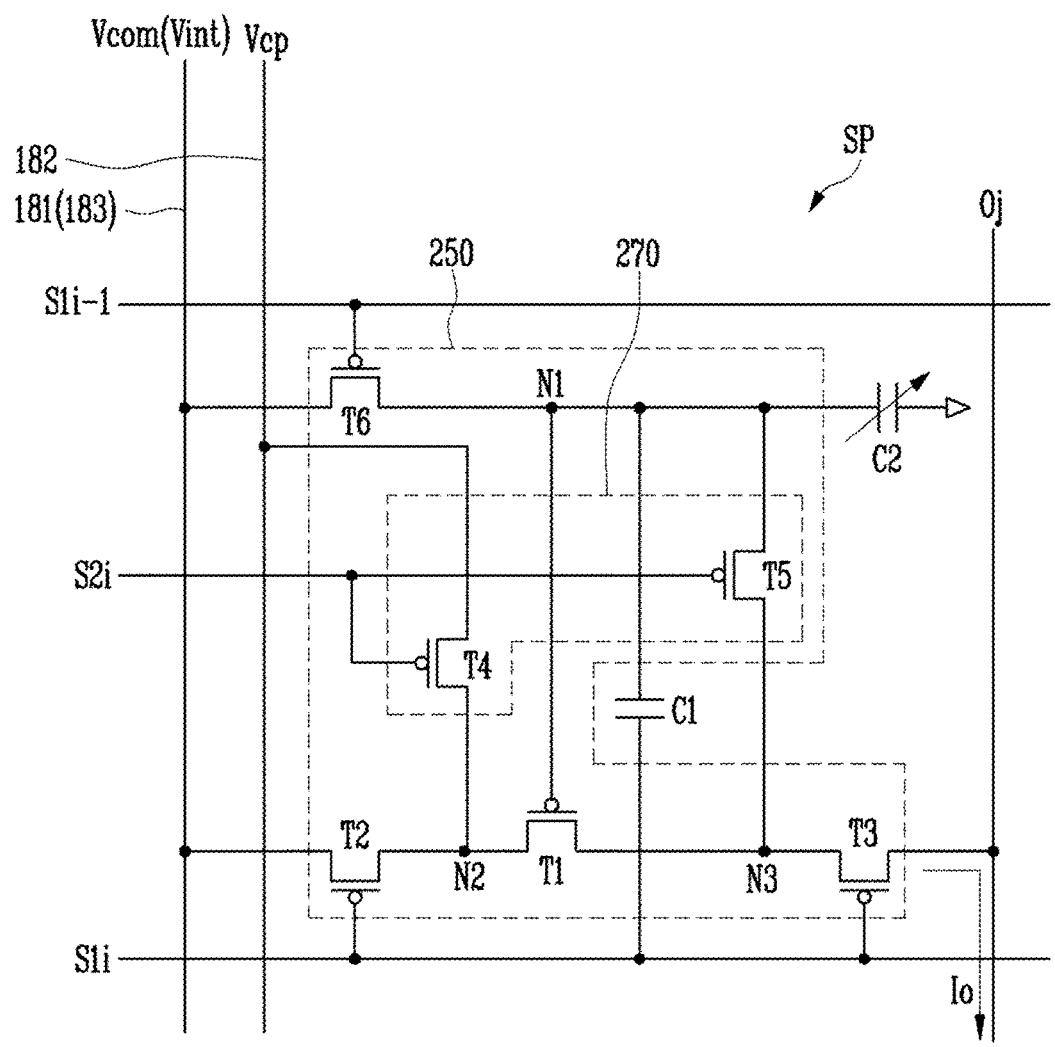

Referring to FIG. 11B, in the case that the third voltage Vint has the same value as first voltage Vcom, one voltage line may be used as both the third voltage line 183 and the first voltage line 181.

Therefore, the first voltage line 181 and the third voltage line 183 may refer to the same voltage line. In comparison with the above exemplary embodiments, the number of voltage lines may be reduced.

Figure 11C:
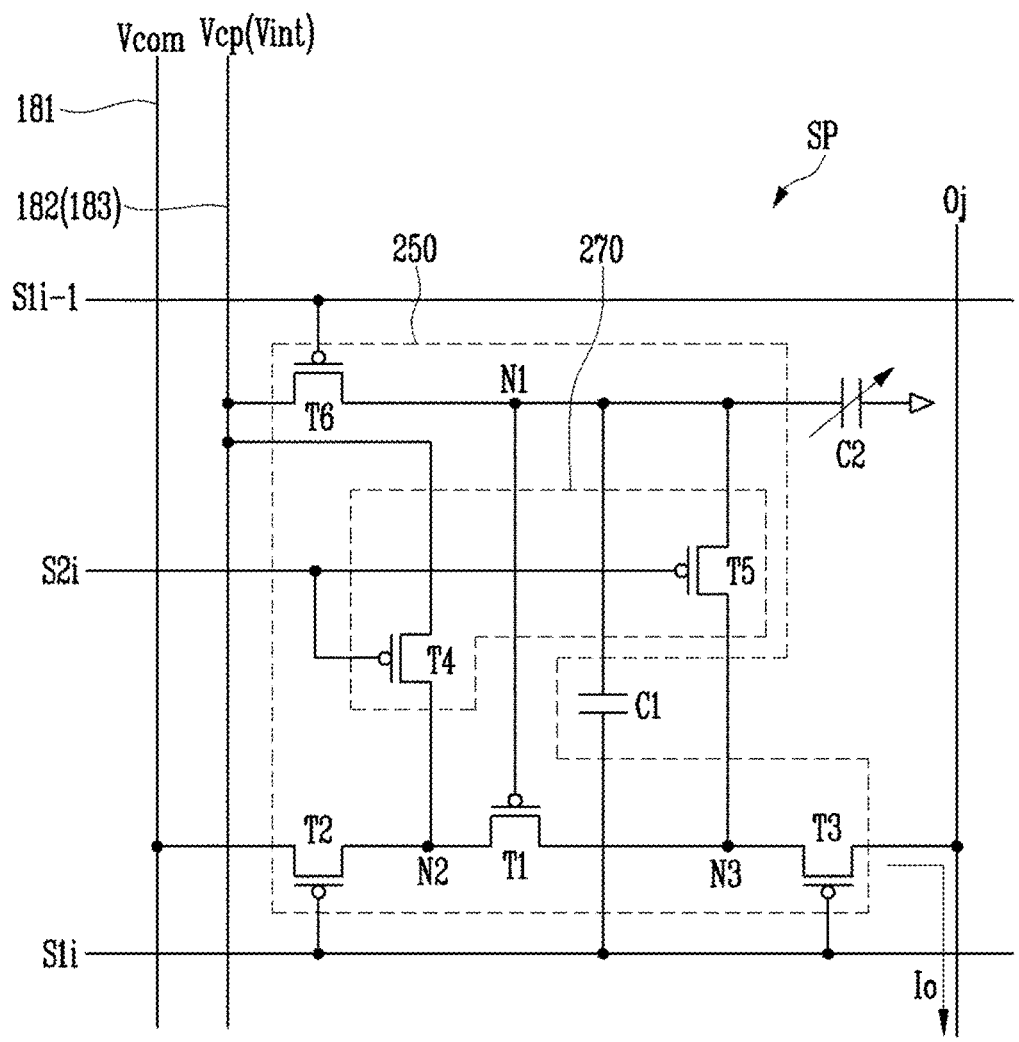

Referring to FIG. 11C, in the case that the third voltage Vint has the same value as the second voltage Vcp, one voltage line may be used as both the third voltage line 183 and the second voltage line 182.

Therefore, the second voltage line 182 and the third voltage line 183 may refer to the same voltage line. In comparison with the above exemplary embodiments, the number of voltage lines may be reduced.

Figure 11D:
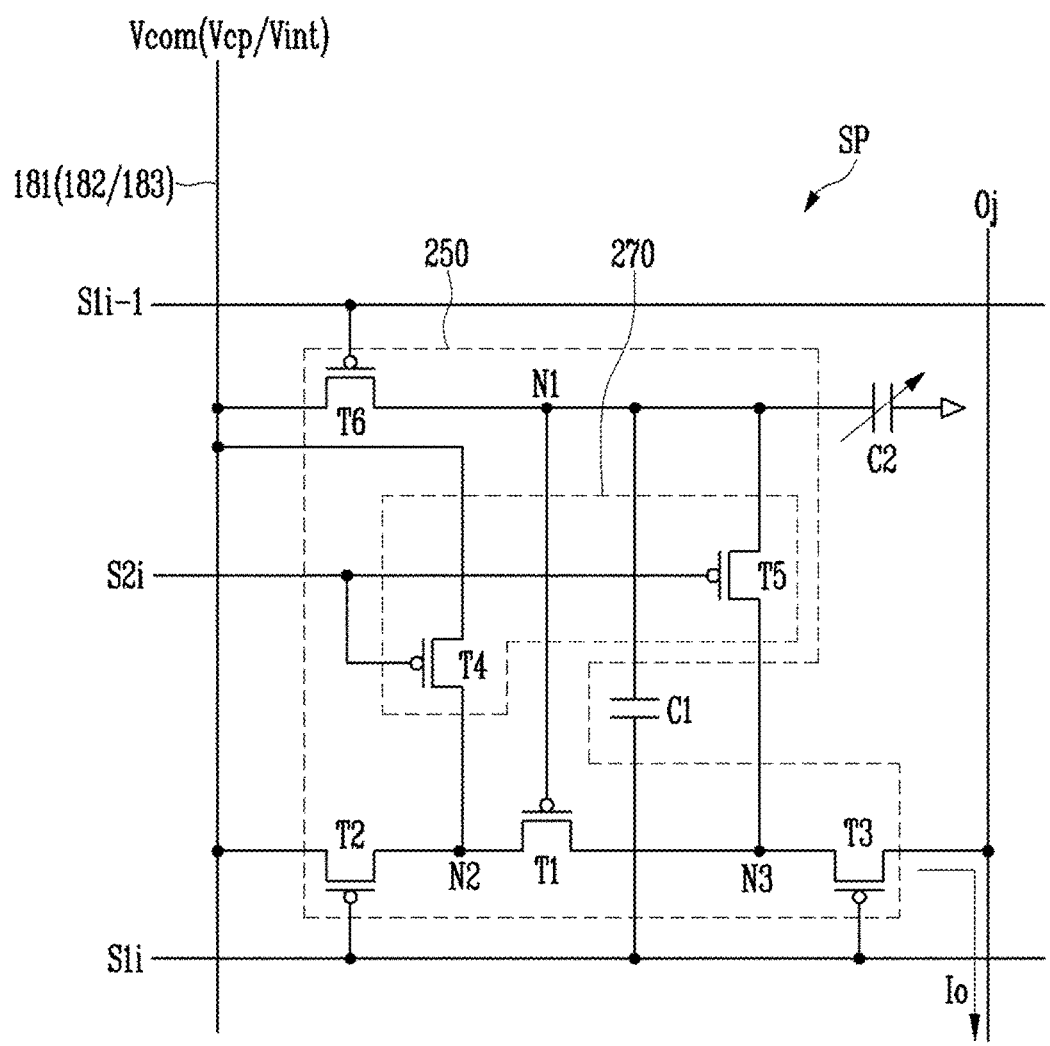

Referring to FIG. 11D, in the case that the second voltage Vcp and the third voltage Vint have the same value as the first voltage Vcom, one voltage line may be used as the second voltage line 182, the third voltage line 183, and the first voltage line 181.

Therefore, the first voltage line 181, the second voltage line 182 and the third voltage line 183 may refer to the same voltage line. In comparison with the above exemplary embodiments, the number of voltage lines may be reduced.

According to the exemplary embodiments of the invention, it is possible to provide a sensor pixel capable of improving fingerprint sensing sensitivity by compensating for the difference in threshold voltage between sensor pixels.

The technical spirit of the invention have been described through the above exemplary embodiments in detail, but the exemplary embodiments have been described herein for purposes of illustration and does not limit the invention. Further, those skilled in the art will appreciate that various modifications may be made without departing from the scope and spirit of the invention.

The detailed description of the invention includes the description of the particular exemplary embodiments, but various modification is available within the scope without departing from the scope and the technical spirit of the invention. Therefore, the scope of the invention is not limited to the exemplary embodiments described, but shall be defined by the claims to be described below and the equivalents to the claims.

What is claimed is:
1. A sensor pixel, comprising:
   a sensor electrode;
   a first transistor including a gate electrode, the gate electrode is connected to the sensor electrode, and the first transistor controls a current output provided to an output line;
   a second transistor connected to a first voltage line and the first transistor;
   a third transistor connected to the first transistor and the output line; and a compensator unit which compensates a threshold voltage of the first transistor,
wherein the compensator units comprises:
   a fourth transistor connected to a second voltage line and a common node between the first and second transistors; and
   a fifth transistor connected to the sensor electrode and a common node between the first and third transistors.

2. The sensor pixel of claim 1, further comprising a capacitor electrode which is included in a first capacitor with the sensor electrode.

3. The sensor pixel of claim 2, wherein a gate electrode of the second transistor and a gate electrode of the third transistor are connected to a third scan line.

4. The sensor pixel of claim 3, wherein the capacitor electrode is connected to the third scan line.

5. The sensor pixel of claim 1, wherein a gate electrode of the fourth transistor and a gate electrode of the fifth transistor are connected to a second scan line.

6. The sensor pixel of claim 1, further comprising a sixth transistor connected to a third voltage line and the sensor electrode.

7. The sensor pixel of claim 6, wherein a gate electrode of the sixth transistor is connected to a first scan line.

8. A sensor pixel, comprising:
   a first transistor including a gate electrode, the gate electrode is connected to a first node, and the first transistor is connected to a second node and a third node with other electrodes of the first transistor;
   a second transistor including a gate electrode connected to a third scan line and which is connected to a first voltage line and the second node in other electrodes;
   a third transistor including a gate electrode connected to the third scan line and which is connected to the third node and an output line in other electrodes;
   a fourth transistor including a gate electrode connected to a second scan line and which is connected to the second node and a second voltage line in other electrodes;
   a fifth transistor including a gate electrode connected to the second scan line and which is connected to the third node and the first node in other electrodes;
   a sixth transistor including a gate electrode connected to a first scan line and which is connected to a third voltage line and the first node in other electrodes; and
   a capacitor connected to the third scan line and the first node.

9. A fingerprint sensor, comprising:
sensor pixels; and
a scan driver which supplies a scan signal to the sensor pixels,
wherein each of the sensor pixels comprises:
a sensor electrode;
a first transistor including a gate electrode, the gate electrode is connected to the sensor electrode, and the first transistor controls a current output provided to an output line;
a second transistor connected to a first voltage line and the first transistor;
a third transistor connected to the first transistor and the output line; and
a compensator unit which compensates for a threshold voltage of the first transistor,
wherein the compensator comprises:
   a fourth transistor connected to a second voltage line and a common node between the first and second transistors; and
   a fifth transistor connected to the sensor electrode and a common node between the first and third transistors.

10. The fingerprint sensor of claim 9, wherein each of the sensor pixels further comprises a capacitor electrode which is included in a first capacitor with the sensor electrode.

11. The fingerprint sensor of claim 10, wherein a gate electrode of the second transistor and a gate electrode of the third transistor are connected to a third scan line.

12. The fingerprint sensor of claim 11, wherein the capacitor electrode is connected to the third scan line.

13. The fingerprint sensor of claim 9, wherein a gate electrode of the fourth transistor and a gate electrode of the fifth transistor are connected to the second scan line.

14. The fingerprint sensor of claim 9, wherein each of the sensor pixels further comprises a sixth transistor connected to a third voltage line and the sensor electrode.

15. The fingerprint sensor of claim 14, wherein a gate electrode of the sixth transistor is connected to a first scan line.

16. The fingerprint sensor of claim 9, wherein the first voltage line and the second voltage line are the same voltage line.

17. The fingerprint sensor of claim 14, wherein the first voltage line and the third voltage line are the same voltage line.

18. The fingerprint sensor of claim 14, wherein the sixth transistor maintains an ON state during a first period,
   each of the fourth and fifth transistors maintains an ON state during a second period, and
   each of the second and third transistors maintains an ON state during a third period.

* * * * *